United States Patent
Byrnes et al.

(10) Patent No.: US 7,261,796 B2
(45) Date of Patent: Aug. 28, 2007

(54) METHOD AND APPARATUS FOR ALIGNING A MACHINE TOOL

(75) Inventors: Brett Wayne Byrnes, Tijeras, NM (US); James Henry Madge, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 157 days.

(21) Appl. No.: 10/252,910

(22) Filed: Sep. 23, 2002

(65) Prior Publication Data

US 2004/0055710 A1    Mar. 25, 2004

(51) Int. Cl.
*H01L 21/00*    (2006.01)
*C23C 16/00*    (2006.01)
*B23H 1/00*    (2006.01)

(52) U.S. Cl. .............................. 156/345.54; 219/69.11; 33/286; 33/613; 204/192.1; 204/298.01

(58) Field of Classification Search ............. 219/69.11; 33/286, 613, 645; 29/271; 156/345.54; 204/192.1, 298.01

See application file for complete search history.

(56) References Cited

U.S. PATENT DOCUMENTS

| | | | |
|---|---|---|---|
| 4,549,061 A * | 10/1985 | Nicholas et al. ......... 219/69.16 |
| 4,553,334 A * | 11/1985 | Fell ............................ 33/628 |
| 5,064,321 A | 11/1991 | Barnes | |
| 5,094,435 A | 3/1992 | Depperman et al. | |
| 5,181,304 A * | 1/1993 | Piotrowski ................ 29/271 |
| 5,219,376 A | 6/1993 | Vinohradsky | |
| 5,487,538 A | 1/1996 | Tibbet | |
| 5,863,397 A * | 1/1999 | Tu et al. ................. 204/298.12 |
| 5,875,696 A | 3/1999 | Grossmann | |
| 5,984,291 A | 11/1999 | Iwata et al. | |
| 6,252,192 B1 | 6/2001 | Lozon et al. | |
| 6,310,312 B1 | 10/2001 | Higuerey et al. | |
| 6,326,576 B1 | 12/2001 | Krenz et al. | |
| 6,389,708 B1 * | 5/2002 | Christensen ............ 33/645 |

FOREIGN PATENT DOCUMENTS

EP    0 603 534    4/1997

OTHER PUBLICATIONS

EP Search Report, App. No. EP 03 25 5940 (Jun. 27, 2006).

* cited by examiner

*Primary Examiner*—Ram N. Kackar
(74) *Attorney, Agent, or Firm*—William Scott Andes; Armstrong Teasdale LLP

(57) ABSTRACT

A machine tool is provided comprising a base, a slide assembly attached to the base for supporting a tool and translating the tool along an axis, and a workpiece holder attached to the base. At least one of the slide assembly and the workpiece holder are movable laterally with respect to the axis. Means are provided for aligning the slide assembly and the workpiece holder in a desired lateral relationship. A method of aligning a machine tool is also provided.

10 Claims, 6 Drawing Sheets

METHOD AND APPARATUS FOR ALIGNING A MACHINE TOOL

BACKGROUND OF THE INVENTION

This invention relates generally to machine tools and more particularly to alignment of a machine tool which moves a tool along an axis to engage a workpiece.

Many machine tools operate by moving a tool along an axis to engage a workpiece, for example drill presses, vertical mills, broaches, etc.

One machine tool of this type is an electrical discharge machining ("EDM") apparatus that includes a linear slide which carries a clamp holding an electrode. The linear slide is mounted to a base by an insulator, such as a ceramic tube. An interchangeable part holder is attached to the base. To ensure the desired machining accuracy, the part holder must be accurately positioned laterally with respect to the linear slide. This typically requires that the base be custom machined, which is expensive and time consuming.

Accordingly, there is a need for a simple and accurate system of aligning a machine tool.

BRIEF SUMMARY OF THE INVENTION

The above-mentioned need is met by the present invention, which provides a machine tool comprising a base, a slide assembly attached to the base for supporting a tool and translating the tool along an axis, and a workpiece holder attached to the base. At least one of the slide assembly and the workpiece holder are movable laterally with respect to the axis. Means are provided for aligning the slide assembly and the workpiece holder in a desired lateral relationship. A method of aligning a machine tool is also provided.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
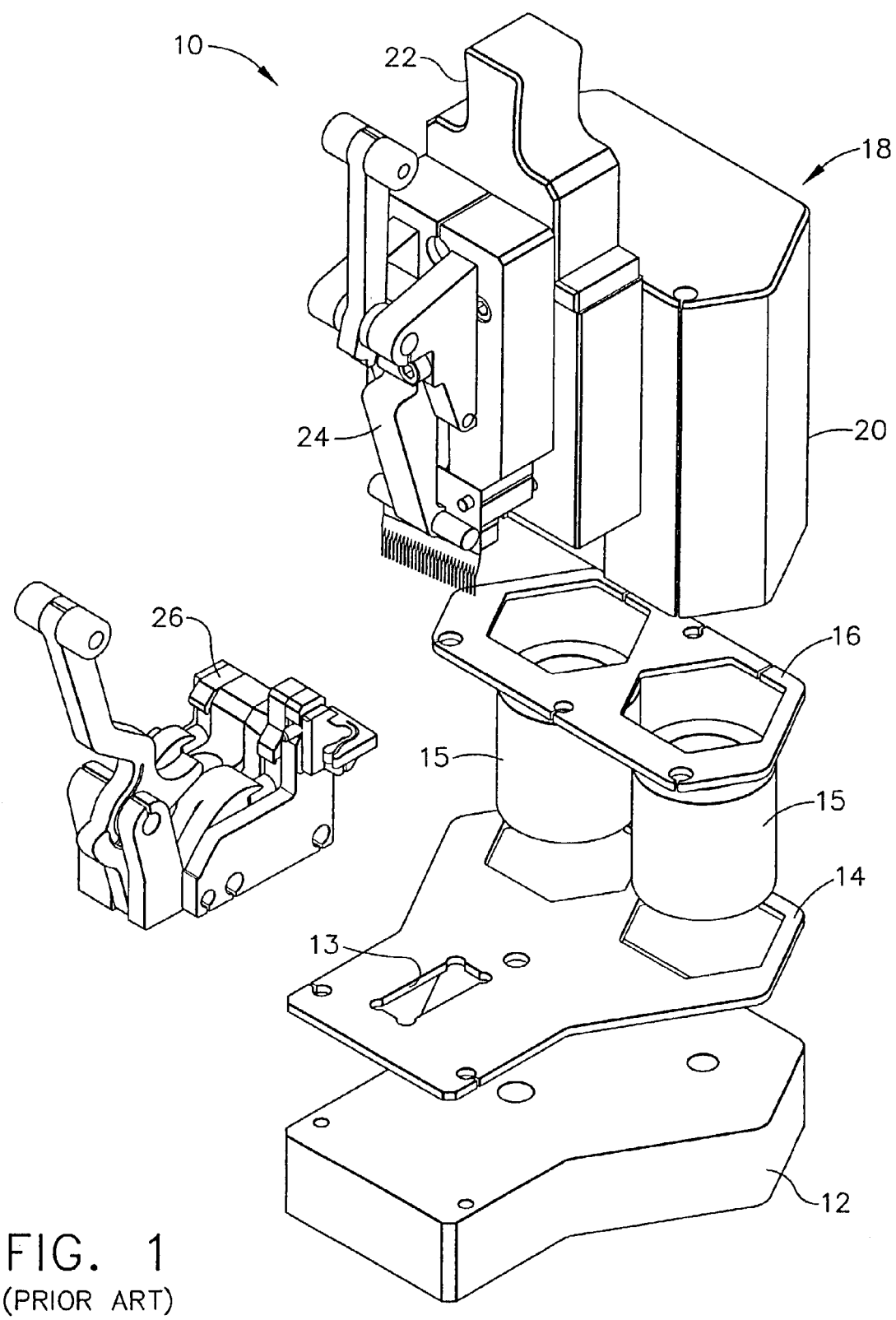
FIG. 1 is a schematic, partially exploded perspective view of a prior art machine tool.

Referring to the drawings wherein identical reference numerals denote the same elements throughout the various views, FIG. 1 illustrates a station of a prior art electrical discharge machining ("EDM") fixture 10, which is representative of a machine tool which carries a tool that moves along an axis to engage a workpiece. It is noted that the prior art EDM fixture 10, as well as the machine tool of the present invention, are described herein with reference to a three-axis coordinate system, depicted in FIG. 1, which has mutually perpendicular X, Y and Z directions. The Z-direction is parallel to the movement of the tool along the major axis of the slide, the Y-direction represents "in" and "out" motion when viewed from the front of the EDM fixture 10, and the X-direction represents "left" and "right" motion when viewed from the front of the EDM fixture 10. The term "vertical" is used herein to refer to movement parallel to the Z-axis, while the term "lateral" refers to movement parallel to the X-Y plane.

The main components of the EDM fixture 10 are a base 12, a locating plate 14, one or more ceramic insulating tubes 15, a slide assembly mounting plate 16, a slide assembly 18 including a stationary member 20 and a slide 22, an electrode holder 24, and a part holder 26. The slide assembly 18 has very precise motion (that is, it exhibits very little lateral motion) once properly positioned. However, the slide assembly 18 with its attached electrode holder 24 must be accurately positioned relative to the part holder 26 during the initial setup to ensure correct positioning.

The prior art technique used to align the electrode holder 24 is to first partially assemble the fixture 10. In doing so, the slide assembly 18 is attached to the insulating tubes 15 by the slide assembly mounting plate 16 in a nominal lateral position. The term "nominal position" is used herein to mean a preselected position which may not account for variance in the actual dimensions of an individual component. The location of the slide 22 is then measured, for example with a coordinate measuring machine. A keyway 13 is then custom machined into the locating plate 14 to eliminate any positional error in the slide assembly 18. The locating plate 14 precisely positions the part holder 26 relative to the ceramic insulating tubes 15. If multiple operating stations are being used, this process is repeated for each station. While this alignment process results in an accurate setup, it is costly and time consuming because of the need to measure and machine a locating plate 14 for each individual station.

Figure 2:
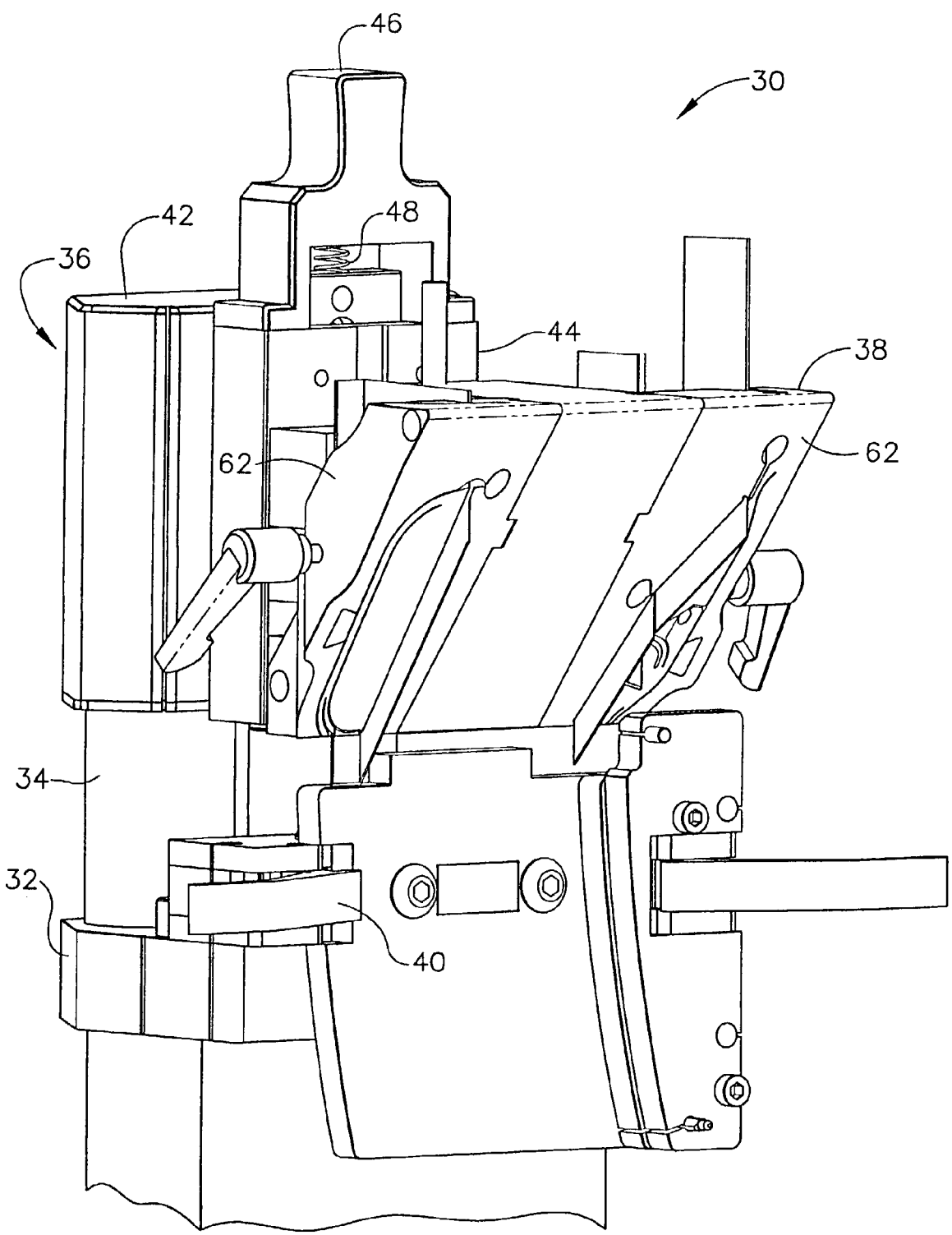
FIG. 2 is a schematic perspective view of an exemplary machine tool constructed in accordance with the present invention.

An exemplary embodiment of a machine tool 30 constructed according to the present invention is illustrated in FIG. 2. The main components of the machine tool 30 are a base 32, one or more vertically extending supports 34, a slide assembly 36, a tool holder 38, and a workpiece holder 40. In the illustrated example the machine tool 30 is depicted as an electrical discharge machining ("EDM") apparatus. However, the alignment system of the present invention is equally applicable to other types of machine tools which carry a tool that moves along an axis to contact a workpiece, for example a drill press, vertical mill, broach, or the like.

The slide assembly 36 includes a stationary member 42 and a slide 44. The slide 44 is tightly restrained to avoid lateral movement, while moving freely in the Z direction relative to the stationary member 42. Typical commercially available units limit lateral motion of the slide 44 to about 0.013 mm (0.0005 in.) Suitable slide assemblies of a known type (often called a linear slide or ball slide) are available from Zero Gage Company, Plymouth, Mich. 48170. The slide assembly 36 is not limited to this particular type of slide assembly. Any known type of structure which allows free movement of a tool along an axis and restrains movement lateral to the axis may be used. The illustrated slide assembly 36 includes an arch 46 which is contacted by a hydraulic press, micrometer feed assembly, linear motor, or other known means for traversing the slide 44 in the Z direction in a controlled manner during a machining operation. A spring 48 returns the slide 44 to its starting position at the end of a machining operation.

The vertically extending supports 34 are attached to the base 32 and the slide assembly 36 and serve to position the slide assembly 36 at a desired distance from the base 32. In the illustrated example the vertically extending supports 34 are ceramic tubes which electrically insulate the slide assembly 36 from the base 32, as required in an EDM application. Other known types of supports, such as metallic tubes or bars, could be used for other applications.

Figure 3:
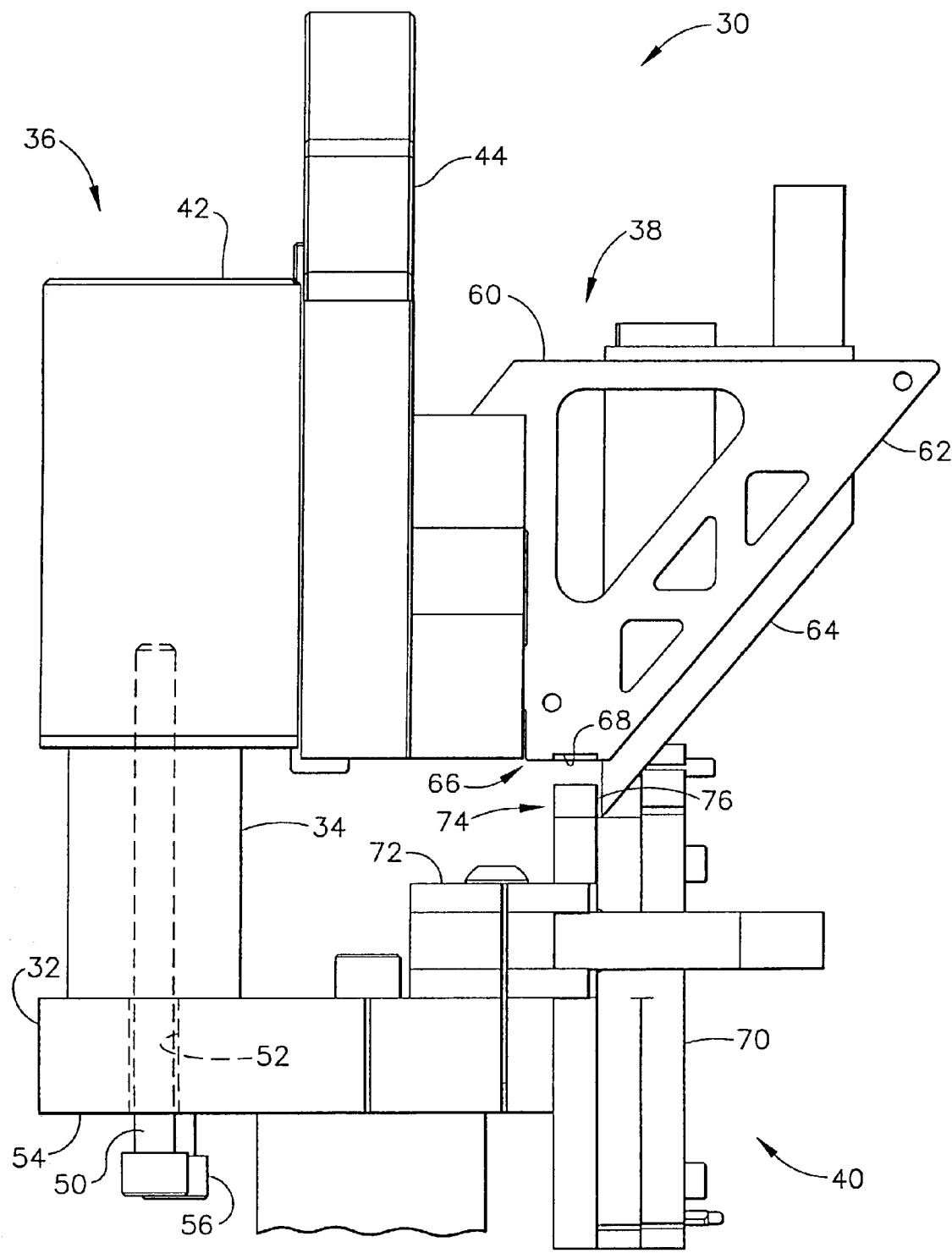
FIG. 3 is an enlarged side view of a portion of the machine tool of FIG. 2.

Referring now to FIG. 3, the machine tool 30 is assembled by mounting the slide assembly 36 and the vertical supports 34 to the base 32 in a manner which allows lateral movement of the slide assembly 36 relative to the base 32. In the illustrated example this is done by way of clamp bolts 50 which pass through clearance holes 52 in the base 32 and up through the vertically extending supports 34, and thread into the stationary member 42. Insulating washers 54, for example of a ceramic material, are provided under the heads 56 of the clamp bolts 50 to ensure that the slide assembly 36 remains insulated from the base 32. When the clamp bolts 50 are tightened the slide assembly 36 is clamped into a fixed position in the lateral direction.

The tool holder 38 may be any structure capable of holding a tool for engaging a workpiece. In the illustrated example, the tool holder 38 is an EDM electrode clamp assembly. The tool holder 38 is attached to the slide 44 and moves with the slide 44. The tool holder 38 shown includes a central frame 60 having an electrode clamp 62 attached to each side thereof. For illustrative clarity, one of the electrode clamps 62 is not shown in FIG. 3. Each electrode clamp 62 receives a bar-shaped EDM electrode 64. The tool holder 38 includes a first alignment feature 66. In this example the first alignment feature 66 comprises a slot 68 which is formed through the lower edge of the frame 60. When the electrode holders 62 are attached to the sides of the frame 60, they close in the open sides of the slot 68, so that a square-sided opening is formed.

The workpiece holder 40 has a first portion 70 for locating and restraining a workpiece in a fixed position. Any known type of tooling for holding a workpiece stationary during a machining process may be used, for example a "nest" structure, a spring-clamp structure, a clamp with movable jaws, or other similar device. The workpiece holder 40 also has a second portion 72, such as the illustrated flange, which is used to mount the workpiece holder 40 to the base 32. The workpiece holder 40 incorporates a second alignment feature 74 having a shape and dimensions complementary to those of the first alignment feature 66. In the illustrated example, the second alignment feature 74 is a vertically extending tab 76 having a square cross-section of approximately the same dimensions as the closed-in slot 68 of the tool holder 38.

To set up the machine tool 30 for a machining operation, the workpiece holder 40 is attached to the base 32 in a nominal position in the X and Y directions. The workpiece holder 40 is restrained in this position by locating means such as dowel pins (not shown) which pass through holes in the base 32 and complementary holes in the workpiece holder 40. The slide 44 is then lowered, and the slide assembly 36 moved laterally, until the first alignment feature 66 of the slide assembly 36 is in engagement with the second alignment feature 74 of the workpiece holder 40. The slide assembly 36 is then clamped in the aligned position so that it can not move laterally, for example by tightening the clamp bolts 50. The electrode clamp 62 and the workpiece holder 40 are thus assured of being aligned in a desired lateral relationship. A machining operation may then be carried out by placing a workpiece (not shown) in the workpiece holder 40, advancing the slide 44 so the electrode 64 engages the workpiece, retracting the slide 44, and removing the workpiece.

Figure 4:
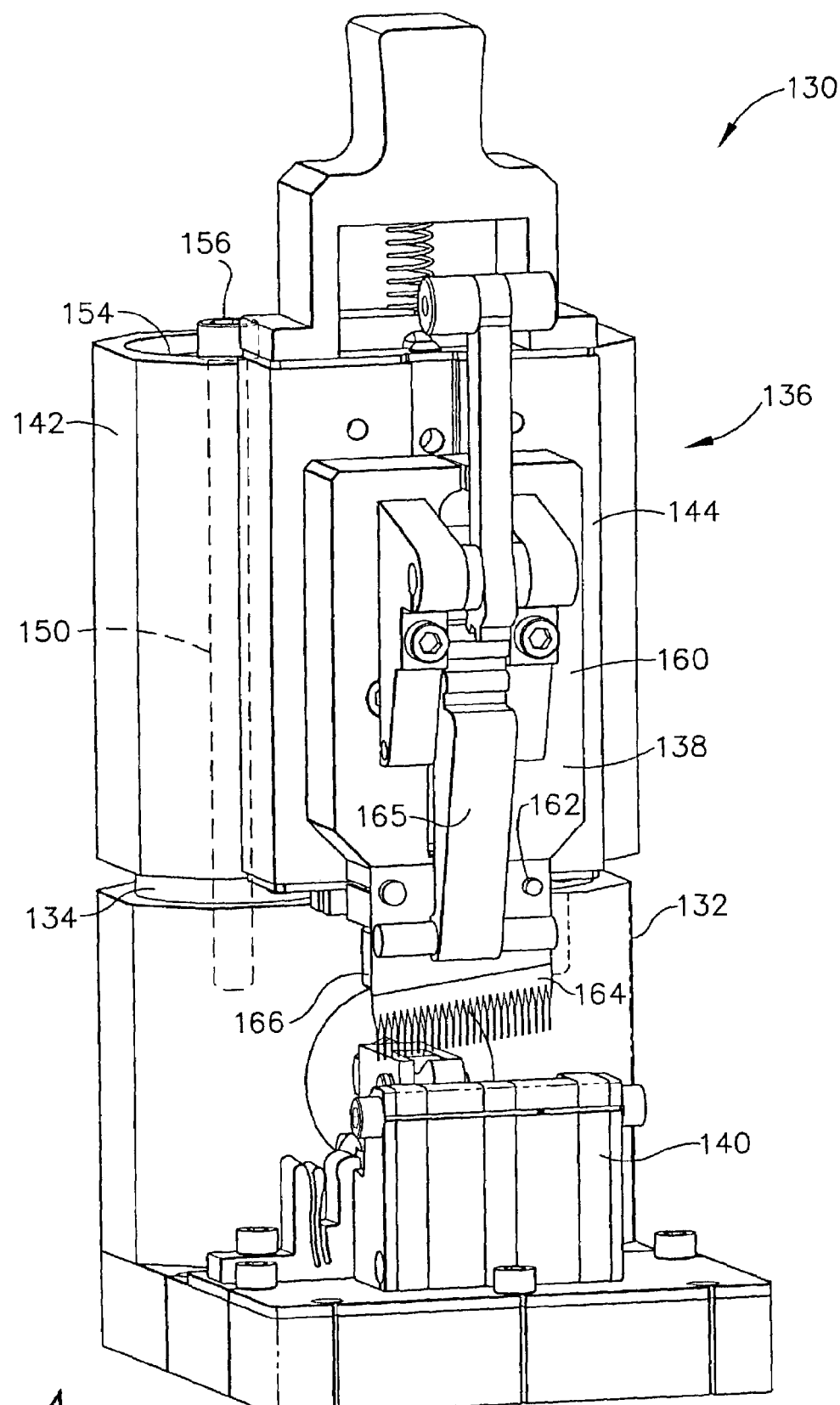
FIG. 4 is a schematic perspective view of a machine tool constructed in accordance with an alternate embodiment of the present invention.

Another possible embodiment of the present invention is shown in FIG. 4. A machine tool 130 has main components that are similar to those of the machine tool 30 shown in FIG. 2, including a base 132, one or more vertically extending supports 134, a slide assembly 136 including a stationary member 142 and a slide 144, a tool holder 138, and a workpiece holder 140.

The machine tool 130 is assembled by mounting the slide assembly 136 and the vertical supports 134 to the base 132 in a manner which allows lateral movement of the slide assembly 136 relative to the base 132. In the illustrated example this is done by way of clamp bolts 150 which pass through clearance holes (not shown) in the stationary member 142 and down through the vertically extending supports 134, and thread into the base 132. Insulating washers 154, for example of a ceramic material, are provided under the heads 156 of the clamp bolts 150 to ensure that the slide assembly 136 remains electrically insulated from the base 132.

The illustrated tool holder 138 is this example is an electrode clamp which includes a body 160 having a pair of electrode locator pins 162, such as dowel pins, protruding therefrom. The electrode locator pins 160 are received in holes of the electrode 164 to locate the electrode in the Z and X directions. When the electrode clamp is closed, a clamp jaw 165 presses against the electrode 164 to hold it against the body 160 and restrains it in the Y-direction. The electrode locator pins 160 also cooperate with the body 160 of the tool holder 138 to define first alignment feature 166.

Figure 5:
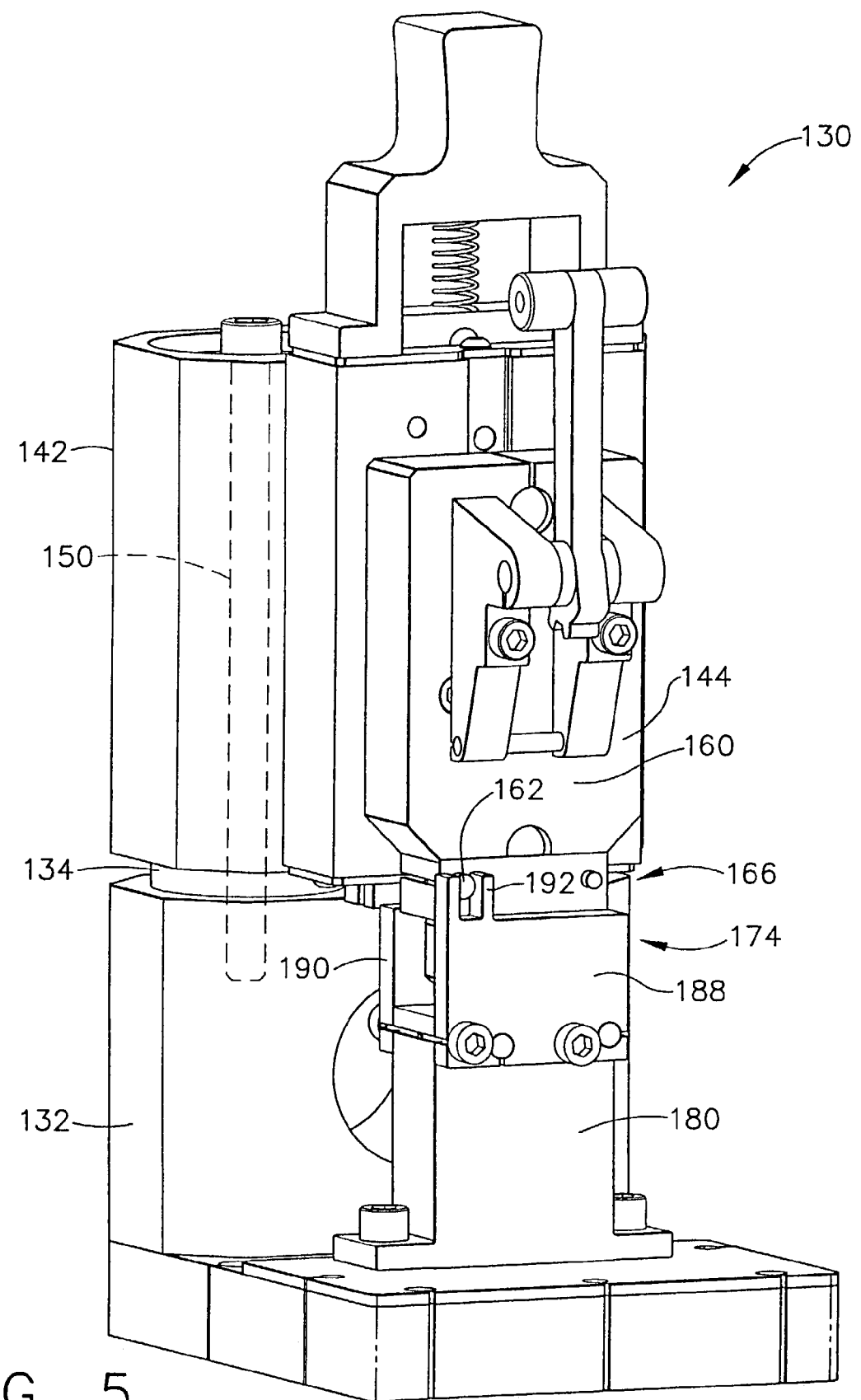
FIG. 5 is a view of the machine tool of FIG. 4 having an alignment device installed therein.
Figure 6:
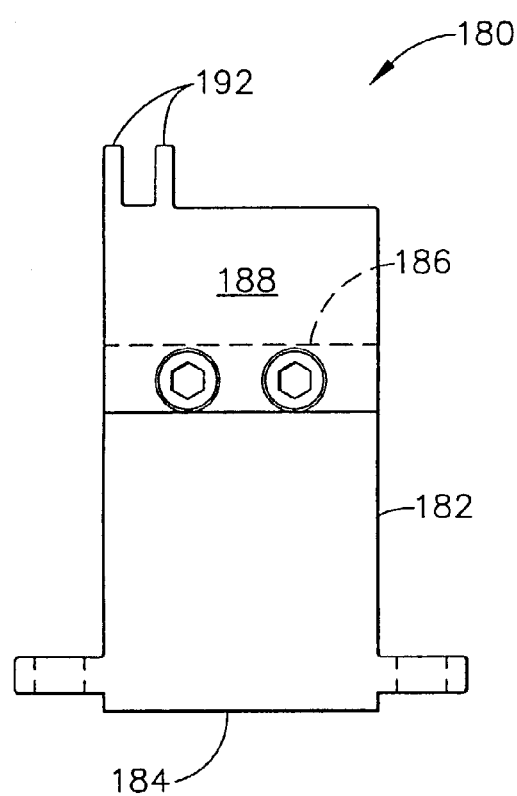
FIG. 6 is a front view of the alignment device of FIG. 4.
Figure 7:
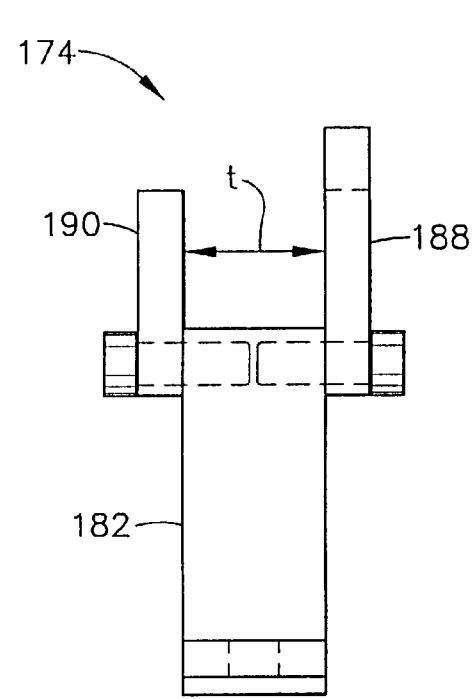
FIG. 7 is a side view of the alignment device of FIG. 6.

In this arrangement, a separate alignment device 180 (see FIG. 5) is provided for the purpose of aligning the slide assembly 136 to the base 132. The alignment device 180 has a generally elongated body 182, as shown in more detail in FIGS. 6 and 7. The body 182 has a lower end 184 and an upper end 186, the lower end 184 includes means for locating the alignment device 180 in a selected lateral position with respect to the base 132 of the machine tool 130. The upper end 186 includes a second alignment feature 174 which is complementary to the first alignment feature 166 of the tool holder 138. In the illustrated example the second alignment feature 174 comprises first and second plates 188 and 190 which are attached to the body 182 of the alignment device 180. The distance t between the plates is selected to be substantially equal to the thickness of the body 160 of the tool holder 138. The first plate 188 includes a pair of tabs 192 extending vertically upward from an upper edge thereof.

To align the machine tool 130, the alignment device 180 is secured to the base 132 in a nominal position. For example, dowel pins (not shown) could be placed in holes in the base 132 and corresponding holes in the alignment device. Once the alignment device 180 is secured to the base 132, the slide 144 is then lowered, and the slide assembly 136 moved laterally, until the first alignment feature 166 is in engagement with the second alignment feature 174. In the illustrated example, the body 160 of the tool holder 138 is restrained in the Y direction between the first and second plates 188 and 190, while one of the electrode locator pins 162 is received between the tabs 192 of the alignment device 180 to restrain the tool holder body 160 in the X direction. The slide assembly 136 is then secured to the vertical supports 134, for example by tightening the clamp bolts 150. The alignment device 180 is then removed and the workpiece holder 140 installed (see FIG. 4). The workpiece holder 140 is designed so that the worpiece will be held in the proper position when the workpiece holder 140 is attached to the base 132 at the same location where the alignement device 180 was attached during the alignment procedure. Alignment between the tool holder 138 and the workpiece holder 140 is thus assured. A machining operation may then be carried out as described above.

Although the present invention has been described in terms of aligning a linear slide with a workpiece holder by lateral movement of the linear slide, it is also possible to reverse the process. That is, the linear slide with its first alignment feature could be mounted in a nominal position relative to the vertical supports of the machine tool, and means provided to allow lateral motion of the workpiece holder. It is also possible to allow lateral motion of both the linear slide and the workpiece holder. Furthermore, the present invention may be implemented in a machine tool in which the electrode or other tool is mounted on the bottom and the part moves to engage the tool. It is noted that, although specific first and second alignment feature for laterally aligning a tool holder with a workpiece holder have been described herein, any known alignment means may be used which allow the two components to be held in a fixed relative lateral position. For example, a combination of dowel pins and complementary holes, a polygonal tab and a complementary slot, a wedge and a complementary slot, or other similar structures may be used. Additionally, the first alignment feature may be formed in varied locations on the slide assembly, so long as it is positioned so as to be able to engage the second alignment feature of the workpiece fixture in a manner which eliminates the variation of the slide assembly and the base.

The foregoing has described a machine tool comprising a base, a slide assembly attached to the base for supporting a tool and translating the tool along an axis, and a workpiece holder attached to the base. At least one of the slide assembly and the workpiece holder are movable laterally with respect to the axis. Means are provided for aligning the slide assembly and the workpiece holder in a desired lateral relationship. While specific embodiments of the present invention have been described, it will be apparent to those skilled in the art that various modifications thereto can be made without departing from the spirit and scope of the invention as defined in the appended claims.

What is claimed is:

1. A machine tool, comprising:
   a base;
   a support extending vertically from said base;
   a slide assembly slidably coupled to said support;
   a tool holder coupled to said slide assembly, the tool holder including at least one pin;
   said slide assembly configured to support said tool holder and translate said tool holder along an axis; and
   an alignment device,
   the alignment device comprising:
   a first plate and a second plate arranged at a distance sufficient to allow said tool holder to slide between said first plate and said second plate in a direction substantially perpendicular to the length of the pin,
   said first plate having a first tab and a second tab extending therefrom, wherein the slide assembly translates said tool holder to engage the at least one pin between the first tab and the second tab.

2. The machine tool of claim 1, wherein said tool holder holds a tool comprising an electrical discharge machining electrode.

3. The machine tool of claim 1, wherein
   the first tab is parallel to the second tab and the first and second tabs are separated by a distance for accommodating a width of the at least one pin.

4. A machine tool in accordance with claim 1 further comprising a clamp bolt that extends through said base, said support, and at least partially into said slide assembly to facilitate coupling said slide assembly to said base.

5. A machine tool in accordance with claim 4 further comprising an insulating washer coupled between said clamp bolt and said base to facilitate insulating said slide assembly from said base.

6. A machine tool in accordance with claim 5 wherein said insulating washer comprises a ceramic insulating washer.

7. A machine tool, comprising:
   a base;
   a support extending vertically from said base;
   a slide assembly for supporting a tool and translating said tool along an axis, said slide assembly being attached to said support and including a first alignment feature;
   a tool holder coupled to said slide assembly;
   a workpiece holder movably coupled to said base;
   a clamp bolt that extends through said support, said slide assembly, and at least partially into said base to facilitate securing said slide assembly to said base; and
   wherein the first alignment feature comprises a pin and the second alignment feature comprises:
   a first plate and a second plate arranged at a distance sufficient to allow said tool holder to slide between said first plate and said second plate in a direction substantially perpendicular to the length of the pin,
   said first plate having a first tab and a second tab extending therefrom, wherein said slide assembly translates said tool holder to engage the at least one pin between the first tab and the second tab.

8. The machine tool of claim 7, wherein said tool comprises an electrical discharge machining electrode.

9. The machine tool of claim 7, wherein the workpiece holder includes a second alignment feature, the first alignment feature comprises a closed-in slot and the second alignment feature comprises a tab configured to align with the closed-in slot and fit within the closed-in slot.

10. A machine tool in accordance with claim 9 wherein said tab and said closed-in slot have a square cross-sectional profile.

* * * * *